United States Patent [19]

Ide et al.

[11] 3,919,157

[45] Nov. 11, 1975

[54] THERMOPLASTIC RESIN COMPOSITION HAVING HIGH TRANSPARENCY AND HIGH IMPACT STRENGTH

[75] Inventors: Fumio Ide; Kazuo Kishida, both of Ohtake; Toshio Sakurai, Hiroshima; Syoichi Kawakami, Ohtake, all of Japan

[73] Assignees: Mitsubishi Rayon Co., Ltd.; Nitto Chemical Industry Co., Ltd., both of Tokyo, Japan

[22] Filed: Feb. 12, 1974

[21] Appl. No.: 441,891

Related U.S. Application Data

[63] Continuation of Ser. No. 344,501, March 26, 1973, abandoned, which is a continuation of Ser. No. 59,351, July 29, 1970, abandoned.

[30] Foreign Application Priority Data

| Aug. 6, 1969 | Japan | 44-62116 |
| Oct. 31, 1969 | Japan | 44-87313 |

[52] U.S. Cl. 260/29.7 T; 260/29.1 SB; 260/29.7 UA; 260/880 R
[51] Int. Cl. C08c 11/66; C08d 7/00; C08f 19/18
[58] Field of Search 260/29.1 SB, 880 R, 29.7 T

[56] References Cited
UNITED STATES PATENTS

| 3,046,239 | 7/1962 | Calvert | 260/29.1 SB |
| 3,287,443 | 11/1966 | Saito et al. | 260/880 R |
| 3,288,887 | 11/1966 | Yoshino et al. | 260/880 R |
| 3,336,417 | 8/1967 | Sakuma et al. | 260/880 R |

*Primary Examiner*—Donald E. Czaja
*Assistant Examiner*—H. H. Fletcher
*Attorney, Agent, or Firm*—Armstrong, Nikaido & Wegner

[57] ABSTRACT

A novel resin composition having high transparency and high impact strength comprises (I) 97 to 99.99 percent by weight of a resin composed of (A) 10 parts by weight of polybutadiene or a styrene-butadiene rubber containing at least 60 percent by weight of butadiene which has a weight average particle diameter of 0.20 to 0.35 $\mu$ with a particle diameter distribution in the range of 0.05 to 1.5 $\mu$ and a degree of swelling of at least 10, and (B) 15 to 190 parts by weight of a terpolymer of a monomer mixture comprising 30 to 65 percent by weight of styrene, 15 to 68 percent by weight of methyl methacrylate and 2 to 20 percent by weight of acrylonitrile [said resin may be a mixture of (A) and (B) or may be a graft-copolymer of (B) and (A)] and (II) 0.01 to 3 percent by weight of a polyorganosiloxane having a viscosity of 10 to 30 centistokes. From such composition, a transparent and impact resistant molded article can be produced regardless of the molding conditions. Further, the composition, when used in combination with a vinyl chloride polymer, can give an impact resistant resin which is transparent or translucent and has a self-extinguishing property.

8 Claims, No Drawings

THERMOPLASTIC RESIN COMPOSITION HAVING HIGH TRANSPARENCY AND HIGH IMPACT STRENGTH

This application is a continuation of application Ser. No. 344,501, filed Mar. 26, 1973, now abandoned, which application, in turn, is a continuation of application Ser. No. 59,351, filed July 29, 1970, and now abandoned.

This invention relates to a resin composition having high transparency and high impact resistance. More particularly, the invention pertains to a resin composition comprising (I) 97 to 99.99 percent by weight of a resin composed of (A) 10 parts by weight of polybutadiene or a styrene-butadiene rubber containing at least 60 percent of butadiene and (B) 15–190 parts by weight of a terpolymer of a monomer mixture consisting of 22 to 65 percent by weight of styrene, 15 to 68 percent by weight of methyl methacrylate and 2 to 20 percent by weight of acrylonitrile, and (II) 0.01 to 3 percent by weight of an oily organosiloxane polymer.

It has heretofore been well known to obtain impact resistant resins having high transparency by graft-polymerizing, on polymer latexes containing various dienes, methyl methacrylate or a mixture thereof with a monomer copolymerizable with methyl methacrylate. These resins show considerable transparency when molded under suitable modling conditions but have such a drawback that the transparency greatly varies depending on variation of the molding conditions. For example, the resins are markedly deteriorated in transparency if the metal mold temperature or the injection pressure is low, and are deprived of practicality as transparent resins. In other words, the conventional impact resistant resins having high transparency have been able to maintain sufficient transparency only under quite restricted molding conditions.

An object of the present invention is to provide impact resistant resins which are not deteriorated in transparency even when molded under any molding conditions.

Other objects and advantages of the present invention will become apparent from the following description.

In accordance with the present invention, there is provided a highly transparent and impact resistant thermoplastic resin composition which comprises (I) 97 to 99.99 percent by weight of a resin composed of (A) 10 parts by weight of polybutadiene or a styrene-butadiene rubber containing at least 60 percent by weight of butadiene having a weight average particle diameter of 0.20 to 0.35 $\mu$ with a particle diameter distribution in the range of 0.05 to 1.5 $\mu$ and a degree of swelling of at least 10, and (B) 15 to 190 parts by weight of a terpolymer obtained by polymerizing a monomer mixture comprising 22 to 65 percent by weight, preferably 25 to 60 percent by weight, of styrene, 15 to 68 percent by weight, preferably 20 to 60 percent by weight, of methyl methacrylate and 2 to 20 percent by weight of acrylonitrile at least a portion of (I) being a graft-copolymer of (A) and (B) obtained by polymerizing at least 5 parts by weight of said monomer mixture in the presence of said (A) component, said polymerization being effected while continuously or intermittently adding said monomer mixture to a latex of, said (A) component, and (II) 0.01 to 3 percent by weight of an oily organosiloxane polymer.

The resin composition of the present invention has a high surface hardness and toughness and shows excellent fluidity at the time of molding, and the most characteristic property thereof lies in that even when subjected to molding under any molding conditions, the resin composition can always give a molded article excellent in transparency. That is, the resin composition of the present invention is characterized by having such an excellent and practical property that it can always give a molded article excellent in transparency, regardless of the die temperature or cylinder temperature at the time of extrusion molding or regardless of the metal mold temperature, injection rate or cylinder temperature at the time of injection molding. The above-mentioned property has not been seen in conventional resins of this type.

In the resin composition of the present invention, the component (A) of the resin (I) should be polybutadiene or a styrene-butadiene rubber (hereinafter called generically "butadiene rubber") having a weight average particle diameter of 0.20 to 0.35 $\mu$ with a particle diameter distribution in the range of 0.05 to 1.5 $\mu$ and a degree of swelling of at least 10. If a butadiene rubber latex having a weight average particle diameter of up to 0.20 $\mu$ or containing particles of less than 0.05 $\mu$ in diameter is used, there is usually obtained only a resin composition having a low impact strength. On the other hand, if a butadiene rubber latex having a weight average particle diameter of more than 0.35 $\mu$ or containing macro-partiles of more than 1.5 $\mu$ in diameter is used, the resulting resin composition shows a high impact strength but forms mist-like haze, with the result that the transparency of the composition is deteriorated. The formation of such haze is inevitable even in the case where the butadiene rubber is identical in refractive index with the terpolymer, and thus the resulting composition becomes low in practicality.

Further, if the degree of swelling of the butadiene rubber latex used is more than 10, the resulting resin composition is not affected in such properties as transparency and impact resistance, whereas if the degree of swelling of the butadiene rubber latex is less than 10, there is obtained only a resin composition having a low impact strength.

The terpolymer (B), which is the other component of the resin (I), is required to consist of 2 to 20 percent by weight of acrylonitrile, 22 to 65 percent, preferably 25 to 60 percent, by weight of styrene and 15 to 68 percent, preferably 20 to 60 percent, by weight of methyl methacrylate. If the amount of acrylonitrile is less than 2 percent by weight, the resulting composition is not sufficient in mechanical properties, and if the amount of acrylonitrile is more than 20 percent by weight, the resulting resin composition is undesirably colored. The amounts of styrene and methyl methacrylate are so decided that the refractive index of the terpolymer becomes close to that of the butadiene rubber ($n_D^{25}$ = 1.52 to 1.55).

The resin (I) of the present invention is composed of (A) such a butadiene rubber latex as mentioned above and (B) a terpolymer obtained by polymerizing a monomer mixture of acrylonitrile, styrene and methyl methacrylate in amounts within such ranges as mentioned above (the monomer mixture will hereinafter be referred to as "ternary monomer mixture"). The resin (I) can be prepared according to any of the following three processes:

The first process is a grafting process, in which 15 to 190 parts by weight of the ternary monomer mixture is added either continuously or intermittently to a latex containing 10 parts by weight of butadiene rubber as solid at a temperature of 30° to 95°C. and polymerized in the presence of a radical ploymerization initiator to prepare a graft-copolymer resin containing 5 to 40 percent by weight of the butadiene rubber. The second process is a graft-blending process, in which a graft-copolymer obtained by polymerizing, while adding either continuously or intermittently, at least 5 parts by weight of the ternary monomer mixture in the presence of a latex containing 10 parts by weight of butadiene rubber, is mixed with a terpolymer separately obtained by polymerization of the ternary monomer mixture to prepare a resin containing 5 to 40 percent weight of the butadiene rubber. The third process is a two stage-grafting process, in which the ternary monomer mixture is polymerized in the presence of a graft-polymer latex, which is the intermediary product of the graft-blending process, to prepare a resin containing 5 to 40 percent by weight of the butadiene rubber. In the second stage graft polymerization in the third process, the ternary monomer mixture may be added either continuously, intermittently or at one time.

The graft-polymerization in each of the first and second processes and the first stage graft polymerization in the third process is required to be effected according to such a procedure that the ternary monomer mixtrue to be graft-polymerized is added to the butadiene-rubber latex, either continuously or intermittently over a period of 30 minutes to 10 hours, and polymerized in the presence of a radical polymerization initiator. When the above-mentioned procedure is adopted, the transparency of a molded article, which is obtained finally, is almost irrelevant to the molding conditions. In this case, it is desirable that the ternary monomer mixture is added at a rate of less than 12 parts by weight per hour to the polymerization system containing 10 parts by weight of the butadiene rubber. When the graft polymerization is carried out in the above manner, there is obtained a graft-polymer with a high grafting efficiency sometimes higher than 50 percent. In contrast thereto, according to an ordinary process, in which the whole amount of the ternary monomer mixture is added to a butadiene-rubber latex at one time, the transparency of a molded article obtained by molding the resulting graft polymer, particularly a molded article obtained according to extrusion molding or injection molding, depends upon the molding conditions, not only where the grafting efficiency is low, but also where the grafting efficiency is high, even in the case where all other preparation conditions adopted in the present invention have been satisfied.

The terpolymer in the second process can be obtained according to any of the known emulsion-, suspension- and bulk-polymerization processes. Further, the mixing of the terpolymer with the graft-polymer may be carried out according to any of latex-blending and dry-blending processes. However, the adoption of the latex-blending process gives more favorable results to the transparency of the resulting resin composition, so that the terpolymer is desirably obtained according to the emulsion polymerization process. Particularly, it is desirable that the ternary monomer mixture is added continuously at a temperature of 30° to 95°C. over a period of more than 30 minutes in the presence of a radical polymerization initiator, using an emulsifier in an amount within the range from the critical micelle concentration thereof to 1.5 percnt by weight based on the weight of the ternary monomer mixture. When such a procedure is adopted, the monomer concentration ratio in the copolymer is substantially identical throughout the polymerization with the initial monomer concentration ratio, the amount of the emulsifier used is markedly small, with the result that the transparency of the resulting terpolymer becomes extremely high. Further, since the monomer mixture is added continuously, no block is formed during the polymerization to make it possible to obtain a polymer latex excellent in stability. Thus, the above-mentioned process is extremely advantageous from the industrial standpoint. Preferable examples of the emulsifier used in the above process are anionic emulsifiers such as alkali metal salts of fatty acid type, resin type and organo-sulfuric acid type compounds.

When subjected to molding, the resin (I) obtained according to the above-mentioned process shows high transparency regardless of the molding conditions but is insufficient in impact strength, so that 0.01 to 3 percent, preferably 0.05 to 0.3 percent, of an organosiloxane polymer is added thereto. If the amount of the organosiloxane polymer is less than 0.01 percent, no effect of addition can be attained, and if the amount of said polymer is more than 3 percent, the transparency of the resulting resin composition is undesirably injured. The organosiloxane polymer can be used as far as it is oily. However, a polymer which has an excessively low polymerization degree and a low viscosity tends to be vaporized and dissipated on heating at the time of extrusion molding. Further, a polymer having a high polymerization degree becomes turbid to tend to injure the transparency of the resulting resin composition. Therefore, the organosiloxane polymer has preferably a viscosity of 10 to 30 centistokes. The organosiloxane polymer used in the present invention includes polydimethyl siloxane, polydiethyl siloxane, polyphenylmethyl siloxane, etc. Among these, polydimethyl siloxane is particularly preferable.

The resin (I) and the oily organosiloxane polymer are ordinarily mixed together by use of such a known means as, for example, ribbon blender, Henschel mixer, mixing roll, Banbury mixer, plastograph or the like. Alternatively, there may be adopted such a procedure that the resin (I) in the form of a latex is thoroughly mixed with the oily organosiloxane polymer (II), and the resulting mixture is coagulated, washed, filtered and then dried.

Ordinarily, the resin composition of the present invention is used as it is as an impact resistant resin having a high transparency. In some cases, the resin composition is mixed with a vinyl chloride polymer, such as polyvinyl chloride or a copolymer of at least 70 percent of vinyl chloride and vinyl bromide, vinylidene chloride, vinyl acetate, acrylic acid, acrylate, methacrylic acid or methacrylate, in an amount of 5 to 70 percent by weight based on the weight of said polymer, whereby an impact resistant resin which is transparent or translucent and which has a self-extinguishing property can be obtained.

The present invention is illustrated in detail below with reference to examples, but the invention is not limited to the examples. In the examples, all percentages and parts are by weight, and the physical properties were evaluated according to the procedures set forth below.

1. Weight average particle diameter and particle diameter distribution of butadiene-rubber latex:

These were decided by measuring according to electron microscopic photographs the diameters of at least 3,000 particles of the latex.

2. Gel content and degree of swelling:

$$\text{Gel content} = \frac{W_3}{W_1} \times 100 \ (\%)$$

$$\text{Degree of swelling} = \frac{W_2}{W_3} - 1$$

wherein $W_1$ is the weight of butadiene rubber used, $W_2$ is the weight of the butadiene rubber which had been swollen by adding purified toluene thereto and allowing the resulting mixture to stand at 30°C. for 48 hours, and $W_3$ is the weight of the completely dried butadiene rubber of $W_2$ 3. Grafting efficiency:

$$\text{Grafting efficiency} = \frac{YI_x}{C_u} \times 100 \ (\%)$$

wherein $C_u$ is the weight fraction of the butadiene rubber used in the graft polymerization; Y is the yield; and $I_x$ is the ratio of the sum of the amount of the free rubber extracted with cyclohexane from the resulting graft-polymer washed with methanol and the amount of the residue formed by extracting the cyclohexane-insoluble graft-polymer with acetone to remove the terpolymer which does not take part in the grafting to the amount of the graft polymer prior to extraction with cyclohexane.

4. Melt index:

The melt index was measured according to the method regulated in ASTM D-238 by maintaining the resin at 200°C. for 5 minutes and then applying thereto a load of 21.6 kg.

5. Impact strength:

A test piece of the size prescribed in ASTM D-256-54T was molded by means of an injection molding machine and the notched Izod impact strength of the molded article was measured.

6. Total luminous transmittance and haze:

A plate of 60 mm. × 100 mm. × 1.7 mm. was formed by injection-molding at 220°C. and the total luminous transmittance and haze of the plate were measured according to the method of ASTM D-1003-61.

EXAMPLE 1

Preparation of rubber latex A:

| | | |
|---|---|---|
| Styrene | 25 | parts |
| Butadiene | 75 | parts |
| n-Dodecyl mercaptan | 0.4 | part |
| Sodium soap of disproportionated rosin | 1.2 | parts |
| Potassium persulfate | 0.3 | part |
| Deionized water | 80 | parts |

A mixture comprising the above-mentioned components was fed to a pressure vessel, and the polymerization of said mixture was initiated at 50°C. Each time when the conversions reached 30 percent and 60 percent, 12.5 parts of water containing 0.75 part of sodium soap of disprotionated resin was added to the system, and the polymerization was effected over a period of 36 hours in total to obtain a rubber latex A with a conversion of 98 percent. The thus obtained rubber latex A had a weight average particle diameter of 0.20 μ, a degree of sweling of 11 and a gel content of 87 percent. The particle diameter distribution of the rubber latex A was in the range of 0.05 to 1.5 μ.

Preparation of graft copolymer latex:

| | | | |
|---|---|---|---|
| Rubber latex A | 50 | parts | (in terms of solid content) |
| Potassium persulfate | 0.25 | part | |
| Water | 200 | parts | |

A mixture of the above-mentioned components was fed to a reactor. After flushing the reactor with nitrogen, the mixture was heated to 70°C. with stirring and then 50 parts of a mixture comprising 12 percent of acrylonitrile, 40 percent of styrene and 48 percent of methyl methacrylate was continuously added to said mixture over a period of 2.5 hours. After the addition, the mixture was allowed to stand for 1 hour and then cooled to obtain a graft copolymer latex.

Preparation of terpolymer latex:

| | | |
|---|---|---|
| Acrylonitrile | 48 | parts |
| Styrene | 160 | " |
| Methyl methacrylate | 192 | " |
| t-Dodecyl mercaptan | 2.0 | " |
| Sodium laurate | 4.0 | " |
| Potassium persulfate | 1.2 | " |
| Deionized water | 800 | " |

A mixture of the above-mentioned components was heated to 70°C. with stirring to obtain a terpolymer latex.

Production of resin composition:

| | | |
|---|---|---|
| Graft-copolymer latex | 100 | parts |
| Terpolymer latex | 400 | " |
| 2,6-Di-tert-butyl-4-methylphenol | 1.5 | " |
| Polydimethyl siloxane (10 centistokes) | 0.75 | " |

A mixture of the above-mentioned components was coagulated in 4,000 parts of a 1 percent aqueous calcium chloride solution at 90°C. and then heated to 95°C. After washing and drying, the mixture was extruded in the form of pellets, which were than subjected to injection molding to obtain a resin composition.

EXAMPLE 2

Preparation of terpolymer latex:

A mixture comprising 48 parts of acrylonitrile, 160 parts of styrene, 192 parts of methyl methacrylate and 1.7 parts of t-dodecyl mercaptan was continuously added over a period of 2.5 hours to a reactor containing 1.2 parts of sodium laurate, 1.2 parts of potassium persulfate and 800 parts of water which had been kept at 70°C. The resulting mixture was allowed to stand as it was for about 30 minutes and then cooled to obtain a terpolymer latex. Subsequently, the same procedures as in Example 1 were repeated, except that the terpolymer obtained in the above manner was used, to produce a resin composition.

EXAMPLE 3

In the same manner as in the case of the rubber latex A of Example 1, except that the amounts of the initially fed sodium soap of disproportionated rosin and water were made 0.9 part and 60 parts, respectively, and the polymerization time was made 40 hours, a rubber latex B was obtained with a conversion of 95 percent. The thus obtained rubber latex B had a weight average particle diameter of 0.28 μ, a degree of swelling of 14 and a gel content of 83 percent. The particle diameter distribution of the latex B was in the range of 0.05 to 1.5 μ. Subsequently, the same procedures as in Example 1 were repeated, except that the thus obtained rubber latex B was used, to produce a resin composition.

EXAMPLE 4

A resin composition was produced in the same manner as in Example 2, except that the rubber latex B was used.

EXAMPLE 5

450 parts of a monomer mixture comprising 12 percent of acrylonitrile, 40 percent of styrene and 48 percent of methyl methacrylate was mixed with 1 part of t-dodecyl mercaptan and then continuously added at 70°C. over a period of 4 hours to 50 parts of the rubber latex B containing 1.35 parts of potassium persulfate and 4.5 parts of sodium laurate to obtain a resin (I).

500 parts of the thus obtained resin (I) was mixed with 0.75 part of polydimethyl siloxane (10 centistokes) and 1.5 parts of 2,6-di-tert-butyl-4-methyphenol, and the resulting mixture was treated in the same manner as in Example 1 to produce a resin composition.

EXAMPLE 6

A graft-copolymer latex was prepared in the same manner as in Example 1, except that the rubber latex B was used. To 100 parts (in terms of solid content) of the thus prepared latex were added 1.2 parts of potassium persulfate and 4 parts of sodium laurate, and to the resulting mixture was continuously added over a period of 3 hours 400 parts of a mixture comprising 12 percent of acrylonitrile, 40 percent of styrene and 48 percent of methyl methacrylate and containing 2 parts of 5-dodecyl mercaptan to obtain a resin (I).

500 parts of the thus obtained resin (I) was mixed with 0.75 part of polydimethyl siloxane (10 centistokes) and 1.5 parts of 2,6-di-tert-butyl-4-metylphenol, and the resulting mixture was treated in the same manner as in Example 1 to produce a resin composition.

EXAMPLE 7

In the same manner as in the case of the rubber latex A of Example 1, except that the amounts of the initially fed sodium soap of disproportionated rosin and water were made 0.8 part and 50 parts, respectively, and the polymerization time was made 45 hours, a rubber latex C was obtained with a conversion of 93 percent. The thus obtained rubber latex C had a weight average particle diameter of 0.35 μ, a degree of swelling of 18 and a gel content of 78 percent. The particle diameter distribtuion of the latex C was in the range of 0.05 to 1.5 μ. Subsequently, the same procedures as in Example 1 were repeated, except that the latex C was used, to produce a resin composition.

EXAMPLE 8

A resin composition was produced in the same manner as in Example 2, except that the rubber latex C was used.

COMPARATIVE EXAMPLE 1

Preparation of rubber latex (a):

| Styrene | 25 | parts |
| Butadiene | 75 | parts |
| n-Dodecyl mercaptan | 0.4 | part |
| Sodium soap of disproportionated rosin | 1.0 | part |
| Potassium persulfate | 0.3 | part |
| Deionized water | 100 | parts |

A mixture of the above-mentioned components was fed to a pressure vessel, and the polymerization of said mixture was initiated at 50°C. When the conversion reached 40 percent, 25 parts of water containing 2.0 parts of sodium soap of disproportionated rosin was added to the system, and the polymerization was effected over a period of 35 hours in total to obtain a rubber latex (a) with a conversion of 96 percent. The thus obtained rubber latex (a) had a weight average particle diameter of 0.15 μ, a degree of swelling of 13 and a gel content of 85 percent. The particle size distribution of the latex (a) was in the range of 0.05 to 1.5 μ. Subsequently, the same procedures as in Example 1 were repeated, except that the said rubber latex (a) was used, to produce a resin composition.

COMPARATIVE EXAMPLE 2

A resin composition was produced in the same manner as in Example 2, except that the rubber latex (a) was used.

COMPARATIVE EXAMPLE 3

Preparation of rubber latex (b):

| Styrene | 25 | parts |
| Butadiene | 75 | " |
| n-Dodecyl mercaptan | 0.4 | " |
| Sodium soap of disproportionated rosin | 0.7 | " |
| Potassium persulfate | 0.3 | " |
| Deionized water | 50 | " |

A mixture of the above-mentioned components was fed to a pressure vessel, and the polymerization of said mixture was initiated at 50°C. Each time when the conversions reached 30 percent and 60 percent, 12.5 parts of water containing 0.75 part of sodium soap of disproportionated rosin was added to the system, and the polymerization was effected over a period of 48 hours in total to obtain a rubber latex (b) with a conversion of 93.5 percent. The thus obtained rubber latex had a weight average particle diameter of 0.38 μ, a degree of swelling of 15 and a gel content of 76 percent. Subsequently, the same procedures as in Example 1 were repeated, except that the said rubber latex (b) was used, to produce a resin composition.

COMPARATIVE EXAMPLE 4

A resin composition was produced in the same manner as in Example 2, except that the rubber latex (b) was used.

The thus produced resin compositions of Examples 1 to 8 and Comparative Examples 1 to 4 were evaluated in physical properties to obtain the results set forth in Table 1.

Table 1

| Example | Average particle diameter of rubber latex (μ) | Grafting efficiency (%) | Melt index (g/10 min) | Izod impact strength (kg.cm/cm²) | Total luminous transmittance (%) Metal mold temperature 30°C Molding pressure 60 kg/cm² | Total luminous transmittance (%) Metal mold temperature 30°C Molding pressure 70 kg/cm² | Total luminous transmittance (%) Metal mold temperature 80°C Molding pressure 60 kg/cm² | Total luminous transmittance (%) Metal mold temperature 80°C Molding pressure 70 kg/cm² | Haze (%) Metal mold temperature 30°C Molding pressure 60 kg/cm² | Haze (%) Metal mold temperature 30°C Molding pressure 70 kg/cm² | Haze (%) Metal mold temperature 80°C Molding pressure 60 kg/cm² | Haze (%) Metal mold temperature 80°C Molding pressure 70 kg/cm² |
|---|---|---|---|---|---|---|---|---|---|---|---|---|
| Comparative Example 1 | 0.15 | 78 | 28 | 2.7 | 90.0 | 90.2 | 90.2 | 90.5 | 6.5 | 5.5 | 6.6 | 5.8 |
| Comparative Example 2 | " | " | 30 | " | 91.5 | 91.8 | 91.5 | 91.8 | 2.5 | 2.3 | 2.4 | 2.2 |
| Example 1 | 0.20 | 72 | 35 | 5.7 | 90.1 | 90.3 | 89.9 | 90.3 | 6.2 | 5.1 | 6.0 | 6.0 |
| " 2 | " | " | 33 | 5.9 | 91.3 | 91.5 | 91.5 | 91.5 | 2.7 | 2.6 | 2.5 | 2.5 |
| " 3 | 0.28 | " | 38 | 8.5 | 90.1 | 90.5 | 90.1 | 90.0 | 7.0 | 5.8 | 7.0 | 5.6 |
| " 4 | " | " | 34 | 8.8 | 91.4 | 91.5 | 91.4 | 91.6 | 3.3 | 3.0 | 3.2 | 3.0 |
| " 5 | " | 68 | 40 | 8.2 | 89.2 | 89.5 | 89.5 | 89.8 | 8.2 | 7.0 | 7.5 | 6.2 |
| " 6 | " | 107 | 31 | 8.7 | 90.0 | 90.5 | 90.5 | 90.8 | 6.2 | 5.8 | 6.5 | 5.7 |
| " 7 | 0.35 | 71 | 41 | 9.2 | 89.5 | 89.8 | 90.0 | 89.5 | 9.2 | 9.0 | 9.1 | 8.5 |
| " 8 | " | " | 38 | 8.9 | 89.7 | 90.0 | 89.9 | 90.2 | 11.2 | 9.5 | 12.3 | 9.0 |
| Comparative Example 3 | 0.38 | 70 | 48 | 9.2 | 85.3 | 86.5 | 85.2 | 85.8 | 20.1 | 19.5 | 22.1 | 18.5 |
| Comparative Example 4 | " | " | 42 | 9.4 | 88.2 | 88.0 | 89.0 | 89.0 | 19.5 | 18.5 | 19.5 | 18.3 |

As is clear from Table 1, it is understood that in case the weight average particle diameter of the styrene-butadiene rubber is 0.15 μ, the resin is always transparent, regardless of the injection molding conditions, but is low in impact value and insufficient in practical efficiency. Further, in case the average particle diameter of the styrene-butadiene rubber is 0.38 μ, the resin is low in transparency and particularly exhibits a mist-like haze. In contrast thereto, in case the average particle diameter of the styrene-butadiene rubber is 0.20 to 0.35 μ, the resin has a total luminous transmittance of more than 89 percent and a haze value of less than 10 percent, and the transparency thereof is not dominated by the molding conditions. Further, the resin shows an Izod impact strength of more than 5 kg/cm².

EXAMPLE 9

A graft copolymer latex was prepared by polymerizing, while continuously adding over a period of 90 minutes, the same acrylonitrile-styrene-methyl methacrylate monomer mixture as in Example 1 in the presence of the rubber latex B, in a ratio of the rubber latex B to the monomer mixture of 5:3. A resin composition was produced in the same manner as in Example 1, except that the thus prepared graft-copolymer latex was used.

EXAMPLE 10

A resin composition was prepared in the same manner as in Example 2, except that the graft-copolymer latex prepared in Example 9 was used.

EXAMPLE 11

A graft copolymer latex was prepared by polymerizing, while continuously adding over a period of 5 hours, the same acrylonitrile-styrene-methyl methacrylate monomer mixture as in Example 1 in the presence of the rubber latex B in a ratio of the rubber latex B to the monomer mixture of 1:3. A resin composition was prepared as in Example 1, except that the thus prepared graft-copolymer latex was used.

EXAMPLE 12

A resin composition was prepared in the same manner as in Example 2, except that the graft-copolymer latex prepared in Example 11 was used.

Comparative Example 5

A graft-copolymer latex was prepared by polymerizing while continuously adding over a period of 15 minutes, the same acrylonitrile-styrene-methyl methacrylate monomer mixture as in Example 1 in the presence of the rubber latex B in a ratio of the rubber latex B to the monomer mixture of 10:1. A resin composition was prepared in the same manner as in Example 1, except that the thus prepared graft-copolymer latex was used.

COMPARATIVE EXAMPLE 6

A resin composition was prepared in the same manner as in Example 2, except that the graft-copolymer latex prepared in Comparative Example 5 was used.

COMPARATIVE EXAMPLE 7

A graft-copolymer latex was prepared by polymerizing, while continuously adding over a period of 30 minutes, the same acrylonitrile-styrene-methyl methacrylate monomer mixture as in Example 1 in the presence of the rubber latex B in a ratio of the rubber latex B to the monomer mixture of 5:1. A resin composition was prepared in the same manner as in Example 1, except that the thus prepared graft-copolymer latex was used.

COMPARATIVE EXAMPLE 8

A resin composition was prepared as in Example 2, except that the graft-copolymer prepared in Comparative Example 7 was used.

COMPARATIVE EXAMPLE 9

A graft copolymer latex was prepared by polymerizing, while continuously adding over a period of 1 hour, the same acrylonitrile-styrene-methyl methacrylate monomer mixture as in Example 1 in the presence of the rubber latex B in a ratio of the rubber latex B to the monomer mixture of 5:2. A resin composition was prepared in the same manner as in Example 1, except that the thus prepared graft-copolymer latex was used.

COMPARATIVE EXAMPLE 10

A resin composition was prepared in the same manner as in Example 2, except that the graft-copolymer latex prepared in Comparative Example 9 was used.

The thus obtained resin compositions of Examples 9 to 12 and Comparative Examples 5 to 10 were evaluated in physical properties to obtain the results set forth in Table 2, in which there are also shown the physical properties of the resin compositions of Examples 3 and 4.

Table 2

| Example | Grafting efficiency (%) | Izod impact strength (kg.cm/cm²) | Total luminous transmittance (%) | | | |
|---|---|---|---|---|---|---|
| | | | Metal mold temperature 30°C | | Metal mold temperature 80°C | |
| | | | Molding pressure 60 kg/cm² | Molding pressure 70 kg/cm² | Molding pressure 60 kg/cm² | Molding pressure 70 kg/cm² |
| Comparative Example 5 | 9 | — | 86.2 | 86.0 | 87.0 | 89.1 |
| " 6 | " | 8.4 | 86.5 | 86.2 | 88.0 | 90.5 |
| " 7 | 17 | — | 87.0 | 87.2 | 88.2 | 89.3 |
| " 8 | " | 7.9 | 87.0 | 87.5 | 89.0 | 90.5 |
| " 9 | 30 | — | 88.0 | 88.2 | 88.7 | 89.2 |
| " 10 | " | 8.2 | 89.0 | 89.8 | 89.5 | 91.0 |
| Example 9 | 52 | — | 89.7 | 90.0 | 89.9 | 89.9 |
| " 10 | " | 8.2 | 90.7 | 90.7 | 91.3 | 91.4 |
| " 3 | 72 | — | 90.1 | 90.5 | 90.1 | 90.0 |
| " 4 | " | 8.8 | 91.4 | 91.5 | 91.4 | 91.6 |
| " 11 | 210 | — | 90.3 | 90.3 | 90.2 | 90.4 |
| " 12 | " | 8.5 | 90.7 | 90.7 | 90.5 | 90.6 |

| Haze (%) | | | |
|---|---|---|---|
| Metal mold temperature 30°C | | Metal mold temperature 80°C | |
| Molding pressure 60 kg/cm² | Molding pressure 70 kg/cm² | Molding pressure 60 kg/cm² | Molding pressure 70 kg/cm² |
| 65.6 | 37.4 | 25.3 | 7.5 |
| 67.1 | 42.0 | 27.8 | 5.7 |
| 45.0 | 26.8 | 17.5 | 8.0 |
| 50.2 | 29.8 | 17.2 | 5.0 |
| 28.4 | 20.2 | 12.5 | 8.0 |
| 24.3 | 21.0 | 14.5 | 5.3 |
| 12.3 | 10.3 | 8.2 | 6.3 |
| 10.3 | 9.7 | 6.5 | 4.5 |
| 7.0 | 5.8 | 7.0 | 5.6 |
| 3.3 | 3.0 | 3.2 | 3.0 |
| 6.5 | 6.0 | 6.2 | 6.2 |
| 6.0 | 5.8 | 5.9 | 5.6 |

EXAMPLE 13

A resin composition was produced in the same manner as in Example 9, except that the period of addition of the monomer mixture was 30 minutes.

EXAMPLE 14

A resin composition was produced in the same manner as in Example 4, except that the period of addition of the monomer mixture was 30 minutes.

EXAMPLE 15

A resin composition was produced in the same manner as in Example 3, except that the period of addition of the monomer mixture was 1 hour.

EXAMPLE 16

A resin composition was produced in the same manner as in Example 4, except that the period of addition of the monomer mixture was 1 hour.

EXAMPLE 17

A resin composition was produced in the same manner as in Example 3, except that the period of addition of the monomer mixture was 5 hours.

EXAMPLE 18

A resin composition was produced in the same manner as in Example 4, except that the period of addition of the monomer mixture was 5 hours.

COMPARATIVE EXAMPLE 11

A resin composition was produced in the same manner as in Example 3, except that the monomer mixture was fed to the reactor at one time and polymerized at 70°C. for 3 hours.

COMPARATIVE EXAMPLE 12

A resin composition was produced in the same manner as in Example 4, except that the monomer mixture was fed to the reactor at one time and polymerized at 70°C. for 3 hours.

The thus produced resin compositions of Examples 13 to 18 and comparative Examples 11 and 12 were evaluated in physical properties to obtain the results set forth in Table 3, in which there are also shown the physical properties of the resin compositions of Examples 3 and 4.

the terpolymer latex, the time of addition of the monomer mixture was reduced to 30 minutes.

EXAMPLE 21

A resin composition was produced in the same manner as in Example 4, except that in the preparation of the terpolymer latex, the amount of sodium laurate was 1 percent.

COMPARATIVE EXAMPLE 13

Polymerization was effected in the same manner as in Example 4, except that in the preparation of the terpolymer latex, the monomer mixture was added at one time, whereby the whole system was solidified during the polymerization.

COMPARATIVE EXAMPLE 14

A resin composition was produced in the same man-

Table 3

| Example | Period of addition of monomer mixture (min.) | Grafting efficiency (%) | Izod impact strength (kg.cm/cm$^2$) | Total luminous transmittance (%) | | | |
|---|---|---|---|---|---|---|---|
| | | | | Metal mold temperature 30°C. | | Metal mold temperature 80°C. | |
| | | | | Molding pressure 65kg/cm$^2$ | Molding pressure 75kg/cm$^2$ | Molding pressure 65kg/cm$^2$ | Molding pressure 75kg/cm$^2$ |
| Comparative Example 11 | 0 | 69 | — | 86.0 | 87.5 | 88.2 | 89.2 |
| " 12 | " | " | 8.0 | 87.2 | 88.0 | 88.8 | 89.3 |
| Example 13 | 30 | 51 | — | 89.3 | 89.4 | 89.7 | 90.1 |
| " 14 | " | 70 | 7.9 | 89.0 | 89.5 | 89.2 | 90.3 |
| " 15 | 60 | 72 | — | 89.8 | 89.9 | 90.0 | 90.7 |
| " 16 | " | " | 8.2 | 90.0 | 90.0 | 90.3 | 90.8 |
| " 3 | 150 | 72 | — | 90.1 | 90.5 | 90.1 | 90.0 |
| " 4 | " | " | 8.8 | 91.4 | 91.5 | 91.4 | 91.6 |
| " 17 | 300 | 78 | — | 90.0 | 90.5 | 90.7 | 90.6 |
| " 18 | " | " | 8.9 | 91.5 | 91.5 | 91.4 | 91.7 |

| Haze (%) | | | |
|---|---|---|---|
| Metal mold temperature 30°C. | | Metal mold temperature 80°C. | |
| Molding pressure 65kg/cm$^2$ | Molding pressure 75kg/cm$^2$ | Molding pressure 65kg/cm$^2$ | Molding pressure 75kg/cm$^2$ |
| 22.0 | 17.0 | 10.3 | 7.2 |
| 24.0 | 17.0 | 10.2 | 7.0 |
| 13.2 | 12.4 | 8.5 | 7.2 |
| 12.5 | 11.0 | 7.2 | 6.0 |
| 9.2 | 7.5 | 7.3 | 6.1 |
| 10.5 | 9.3 | 6.8 | 5.5 |
| 7.0 | 5.8 | 7.0 | 5.6 |
| 3.3 | 3.0 | 3.2 | 3.0 |
| 6.8 | 5.5 | 5.8 | 5.4 |
| 3.5 | 3.0 | 3.1 | 3.0 |

As is clear from Table 3, it is understood that in case the monomer mixture is added at one time, the transparency of the resulting composition considerably varies depending on the molding conditions.

EXAMPLE 19

A resin composition was produced in the same manner as in Example 4, except that in the preparation of the terpolymer latex, 0.2 percent based on the weight of the monomer mixture of sodium dioctylsulfosuccinate was used as an emulsifier.

EXAMPLE 20

A resin composition was produced in the same manner as in Example 4, except that in the preparation of ner as in Example 4, except that in the preparation of the terpolymer latex, the emulsifier concentration was increased to 1.0 percent and the monomer was fed at one time and polymerized for 5 hours.

COMPARATIVE EXAMPLE 15

A resin composition was produced in the same manner as in Example 4, except that in the preparation of the terpolymer latex, the emulsifier concentration was increased to 2 percent and the monomer mixture was fed at one time.

The thus produced resin compositions of Examples 19 to 21 and Comparative Examples 13 to 15 were evaluated in physical properties to obtain the results set forth in Table 4, in which there are also shown the physical properties of the resin composition of Example 4.

Table 4

| Example | Emulsifier (% based on monomer mixture) | Period of addition of monomer mixture (min.) | Amount of block formed in terpolymer latex (% based on terpolymer) | Izod impact strength (kg.cm/cm²) | Total luminous transmittance (%) (metal mold temperature 60°C. molding pressure 75 kg/cm²) | Haze (%) (metal mold temperature 60°C. molding pressure 75 kg/cm²) |
|---|---|---|---|---|---|---|
| Example 19 | 0.2 | 160 | 0 | 8.5 | 91.8 | 3.0 |
| " 20 | 0.3 | 30 | 0 | 8.3 | 90.7 | 8.4 |
| " 4 | 0.3 | 160 | 0 | 8.8 | 91.5 | 3.2 |
| " 21 | 1.0 | 160 | 0 | 8.2 | 90.0 | 6.3 |
| Comparative Example 13 | 0.3 | 0 | 100 | — | — | — |
| " 14 | 1.0 | 0 | 0.5 | 8.4 | 85.3 | 17.2 |
| " 15 | 2.0 | 0 | 0.2 | 7.9 | 87.3 | 18.0 |

As is clear from Table 4, it is understood that when the monomer mixture is added continuously, the emulsifier concentration can be greatly reduced and the transparency of the resulting resin becomes higher.

COMPARATIVE EXAMPLE 16

A resin composition was obtained in the same manner as in Example 3, except that the polyorganosiloxane was not used.

COMPARATIVE EXAMPLE 17

A resin composition was obtained in the same manner as in Example 4, except that the polyorganosiloxane was not added.

EXAMPLE 22

A resin composition was obtained in the same manner as in Example 3, except that 0.05 part (0.01 percent) of polydimethyl siloxane (20 centistokes) was used as the polyorganosiloxane.

EXAMPLE 23

A resin composition was obtained in the same manner as in Example 4, except that 0.01 percent of polydimethyl siloxane (20 centistokes) was used as the polyorganosiloxane.

EXAMPLE 24

A resin composition was obtained in the same manner as in Example 3, except that 1.0 percent of polydiethyl siloxane (3 centistokes) was used as the polyorganosiloxane.

EXAMPLE 25

A resin composition was obtained in the same manner as in Example 4, except that 1.0 percent of polydiethyl siloxane (3 centistokes) was used as the polyorganosiloxane.

EXAMPLE 26

A resin composition was obtained in the same manner as in Example 3, except that 1.0 percent of polymethylphenyl siloxane (30 centistokes) was used as the polyorganosiloxane.

EXAMPLE 27

A resin composition was obtained in the same manner as in Example 3, except that 3 percent of polymethylphenyl siloxane (30 centistokes) was used as the polyorganosiloxane.

EXAMPLE 28

A resin composition was obtained in the same manner as in Example 4, except that 3 percent of polymethylphenyl siloxane (30 centistokes) was used as the polyorganosiloxane.

COMPARATIVE EXAMPLE 18

A resin composition was obtained in the same manner as in Example 3, except that 4 percent of polydimethyl siloxane was (20 centistokes) was used as the polyorganosiloxane.

COMPARATIVE EXAMPLE 19

A resin composition was obtained in the same manner as in Example 4, except that 4 percent of polydimethyl siloxane (20 centistokes) was used as the polyorganosiloxane.

The resin compositions of Examples 22 to 28 and Comparative Examples 16 to 19 were evaluated in physical properties to obtain the results set forth in Table 5, in which these are also shown the physical properties of the resin composition of Example 3.

Table 5

| Example | Polyorganosiloxane | Amount of polyorganosiloxane (%) | Izod impact strength (kg.cm/cm²) | Total luminous transmittance (%) (metal mold temperature 60°C.) | Haze (%) (metal mold temperature 60°C.) |
|---|---|---|---|---|---|
| Comparative Example 16 | — | 0 | 2.7 | 90.2 | 5.2 |

Table 5-continued

| Example | Poly-organo-siloxane | Amount of polyorgano-siloxane (%) | Izod impact strength (kg.cm/cm²) | Total luminous transmittance (%) (metal mold temperature 60°C.) | Haze (%) (metal mold temperature 60°C.) |
|---|---|---|---|---|---|
| " 17 | — | " | 2.7 | 91.5 | 2.8 |
| Example 22 | A | 0.01 | 5.2 | 90.2 | 5.2 |
| " 23 | " | " | 5.5 | 91.5 | 2.8 |
| " 3 | " | 0.15 | 8.7 | 90.1 | 6.0 |
| " 24 | B | 1.0 | 8.2 | 90.0 | 8.2 |
| " 25 | " | " | 8.3 | 90.0 | 4.5 |
| " 26 | C | " | 5.7 | 90.3 | 6.2 |
| " 27 | " | 3.0 | 6.8 | 89.3 | 10.3 |
| " 28 | " | " | 6.0 | 89.5 | 9.8 |
| Comparative Example 18 | A | 4.0 | 9.2 | 88.0 | 72.0 |
| " 19 | " | " | 9.2 | 85.2 | 72.0 |

A: Polydimethyl siloxane (20 centistokes)
B: Polydiethyl siloxane (3 centistokes)
C: Polymethylphenyl siloxane (30 centistokes)

As is clear from the results set forth in Table 5, it is understood that by mere addition of an extremely small amount of polydimethyl siloxane, the resulting composition is markedly enhanced in impact strength and scarcely lowered in transparency. Likewise, other polyorganosiloxanes such as polydiethyl siloxane, polymethylphenyl siloxane or the like are also quite effective for enhancing the impact strength of the resulting resin composition. However, if the polyorganosiloxane is added in a large amount, the resulting resin composition becomes turbid and low in transparency.

COMPARATIVE EXAMPLES 20–27

Example 3 was repeated, except that each of the materials shown in Table 6 was added in place of the polydimethyl siloxane, to obtain resin compositions having such physical properties as set forth in Table 6, and thus no resin composition excellent in impact strength could be obtained.

Table 6

| Example | Additive | Amount (%) | Izod impact strength | Transparency |
|---|---|---|---|---|
| Comparative Example 16 | None | 0 | 2.7 | Favorable |
| " 20 | Liquid paraffin | 0.5 | 2.7 | " |
| " 21 | " | 2.0 | 2.6 | Hazed |
| " 22 | Barium stearate | 0.5 | 2.8 | " |
| " 23 | " | 2.0 | 2.8 | Opaque |
| " 24 | Polyethylene glycol (cp̄ = 1,000) | 0.5 | 2.7 | Favorable |
| " 25 | " | 2.0 | 2.7 | Somewhat hazed |
| " 26 | Stearic acid | 2.0 | 2.6 | Favorable |
| " 27 | " | 4.0 | 2.3 | " |

EXAMPLE 29

Preparation of rubber latex D:

Polymerization was initiated in entirely the same manner as in the preparation of the rubber latex B. When the polymerization time reached 20 hours, the polymerization was stopped to obtain a rubber latex D having a weight average particle diameter of 0.27 μ, a degree of swelling ~ and a gel content of 0.

Using the thus obtained rubber latex D, a resin composition was produced in the same manner as in Example 5.

EXAMPLE 30

Using the rubber latex D, a resin composition was produced in the same manner as in Example 4.

EXAMPLE 31

Preparation of rubber latex E:

Polymerization was initiated in the same manner as in the case of the rubber latex B, except that 100 parts of butadiene was used in place of the monomer mixture comprising 25 parts of styrene and 75 parts of butadiene, to obtain, after 65 hours, a rubber latex E with a conversion of 94.5 percent. The thus obtained rubber latex E had a weight average particle diameter of 0.28 μ, a degree of swelling of 20 and a gel content of 77 percent. The particle diameter distribution of the latex E was in the range of 0.1 to 1.5 μ.

A graft copolymer latex was obtained in the same manner as in Example 1, except that the rubber latex E was used and a monomer mixture comprising 10 percent of acrylonitirle, 23 percent of styrene and 68 percent of methyl methacrylate was graft-polymerized. Further, a terpolymer latex was obtained in the same manner as in Example 1, except that a monomer mixture comprising 10 percent of acrylonitrile, a 22 percent of styrene and 68 percent of methyl methacrylate was used and the amount of t-dodecyl mercaptan was made 2.8 parts.

A resin composition was prepared in the same manner as in Example 1, except that the thus obtained graft-copolymer latex and terpolymer latex were used.

EXAMPLE 32

A terpolymer latex was obtained in the same manner as in Example 2, except that a monomer mixture comprising 10 percent of acrylonitrile, 22 percent of styrene and 68 percent of methyl methacrylate was used. A resin composition was prepared in the same manner as in Example 1, except that the thus prepared terpolymer latex and the graft-polymer latex prepared in Example 31 were used.

The resin compositions of Examples 29 to 32 were evaluated in physical properties to obtain the results set forth in Table 7.

Table 7

| Example | Grafting efficiency (%) | Melt index | Izod impact strength | Total luminous transmittance (%) | | | |
|---|---|---|---|---|---|---|---|
| | | | | Metal mold temperature 30°C | | Metal mold temperature 80°C. | |
| | | | | Molding pressure 65kg/cm² | Molding pressure 75kg/cm² | Molding pressure 65kg/cm² | Molding pressure 75kg/cm² |
| Example 29 | 75 | 37 | 9.0 | 88.6 | 88.5 | 88.8 | 88.9 |
| " 30 | 75 | 35 | 8.5 | 89.5 | 90.0 | 90.0 | 90.0 |
| " 31 | 80 | 21 | 7.2 | 89.5 | 90.0 | 89.0 | 89.8 |
| " 32 | 80 | 19 | 8.5 | 89.7 | 90.0 | 90.1 | 90.3 |

| Haze (%) | | | |
|---|---|---|---|
| Metal mold temperature 30°C. | | Metal mold temperature 80°C. | |
| Molding pressure 65kg/cm² | Molding pressure 75kg/cm² | Molding pressure 65kg/cm² | Molding pressure 75kg/cm² |
| 8.3 | 8.0 | 7.1 | 6.5 |
| 6.3 | 6.0 | 6.5 | 5.8 |
| 8.3 | 8.2 | 7.6 | 7.7 |
| 6.5 | 5.3 | 6.0 | 5.5 |

EXAMPLES 33-36

Resin compositions were obtained in the same manner as in Example 3, except that the amounts of the graft-copolymer latex and the terpolymer latex were such that the compositions came to have such rubber concentrations as shown in Table 8.

EXAMPLES 37-40

Resin compositions were obtained in the same manner as in Example 4, except that the amounts of the graft-polymer latex and the terpolymer latex were such that the compositions came to have such rubber concentrations as shown in Table 8.

The resin compositions of Examples 33 to 40 were evaluated in physical properties to obtain the results set forth in Table 8, in which these are also shown the physical properties of the resin compositions of Examples 3 and 4.

Table 8

| Example | Styrene-butadiene rubber concentration (%) | Izod impact strength (kg.cm/cm²) | Melt index (g/10 min) | Total luminous transmittance (%) | Haze (%) |
|---|---|---|---|---|---|
| Example 33 | 5 | 5.2 | 47 | 91.0 | 5.2 |
| " 3 | 10 | 8.5 | 38 | 90.0 | 5.6 |
| " 34 | 20 | 27 | 19 | 88.5 | 8.9 |
| " 35 | 30 | 45 | 10 | 88.2 | 10.2 |
| " 36 | 40 | 51 | 5.3 | 88.0 | 11.4 |
| " 37 | 5 | 5.3 | 45 | 91.8 | 2.8 |
| " 4 | 10 | 8.8 | 34 | 91.5 | 3.2 |
| " 38 | 20 | 29 | 17 | 89.5 | 6.3 |
| " 39 | 30 | 44 | 9 | 88.3 | 9.4 |
| " 40 | 40 | 53 | 5 | 88.2 | 10.7 |

As is clear from Table 8, the resin compositions are favorable in impact strength if the rubber concentration thereof is more than 5 percent. The resin compositions are more or less lowered in melt index and transparecy with increasing rubber concentration, but are practically usable so far as the rubber concentration thereof is up to 40 percent.

EXAMPLE 41

The graft-copolymer latex prepared in Example 3 was coagulated in a 1 percent aqueous sulfuric acid solution to form a powder. 100 parts of this powder was mixed by means of a Henschel mixer with 400 parts of a pearly powder obtained by subjecting a monomer mixture comprising 12 percent of acrylonitrile, 40 percent of styrene and 48 percent of methyl methacrylate to suspension polymerization using 0.1 percent of a partial saponification product of polymethyl methacrylate and 0.8 percent of lauroyl peroxide, 1.5 parts of 2,6-di-tert-butyl-4-methylphenol and 0.75 part of polydimethyl siloxane (10 centistokes). The resulting mixture was pelletized by means of an extruder and then subjected to molding to obtain a resin composition. The physical properties of the thus obtained resin composition were as set forth in Table 9.

Table 9

| Melt index | Izod impact strength | Total luminous transmittance (%) | | | |
|---|---|---|---|---|---|
| | | Metal mold temperature 30°C. | | Metal mold temperature 80°C. | |
| | | Molding pressure 65 kg/cm² | Molding pressure 75 kg/cm² | Molding pressure 65 kg/cm² | Molding pressure 75 kg/cm² |
| 35 | 7.8 | 88.5 | 88.6 | 88.2 | 88.4 |

| Haze (%) | | | |
|---|---|---|---|
| Metal mold temperature 30°C. | | Metal mold temperature 80°C. | |
| Molding pressure 65 kg/cm² | Molding pressure 75 kg/cm² | Molding pressure 65 kg/cm² | Molding pressure 75 kg/cm² |
| 9.3 | 9.1 | 9.0 | 8.9 |

EXAMPLES 42–43 and comparative examples 28–29

Graft copolymer latexes were obtained in the same manner as in Example 1, except that the rubber latex B was used and the monomer mixtures shown in Table 10 were graft-polymerized. Further, terpolymer latexes were obtained in the same manner as in Example 1, except that the monomer mixtures shown in Table 10 were used.

Resin compositions were produced in the same manner as in Example 1, except that the thus obtained graft-copolymer latexes and terpolymer latexes were used.

The thus produced resin compositions were evaluated in physical properties to obtain the results set forth in Table 10, in which there are also shown the physical properties of the resin composition of Example 3.

A graft copolymer latex was obtained in the same manner as in Example 1, except that the rubber latex F was used and a monomer mixture comprising 20 percent of acrylonitrile, 60 percent of styrene and 20 percent of methyl methacrylate was graft-polymerized thereon.

Further, a terpolymer latex was obtained in the same manner as in Example 1, except that a monomer mixture comprising 80 parts of acrylonitrile, 240 parts of styrene and 80 parts of methyl methacrylate was used and the amount of t-dodecyl mercaptan was 1.0 part.

A resin composition was produced in the same manner as in Example 1, except that the thus obtained graft-copolymer latex and terpolymer latex were used.

COMPARATIVE EXAMPLE 30

A graft copolymer latex was obtained in the same

Table 10

| | Monomer mixture | | | Izod Impact Strength | Melt Index | Total* Luminous Transmittance | Haze* | Coloration |
|---|---|---|---|---|---|---|---|---|
| | Acrylonitrile | Styrene | MMA | | | | | |
| Comparative Example 28 | 0 | 45 | 55 | 3.8 | 20 | 90.5 | 3.5 | Not colored |
| Example 42 | 2 | 44 | 54 | 6.0 | 23 | 91.1 | 3.6 | " |
| Example 3 | 12 | 40 | 48 | 8.8 | 34 | 91.4 | 3.3 | " |
| Example 43 | 20 | 38 | 42 | 9.5 | 30 | 90.5 | 4.2 | Slightly colored |
| Comparative Example 29 | 30 | 34 | 36 | 9.2 | 25 | 89.6 | 5.0 | Remarkably colored |

*: Sample was prepared at a metal mold temperature of 80°C, at a molding pressure of 75 kg/cm².

EXAMPLE 44

Preparation of rubber latex F:

Polymerization was initiated in the same manner as in the case of the rubber latex B, except that the mixture of 40 parts of styrene and 60 parts of butadiene was used in place of the monomer mixture comprising 25 parts of styrene and 75 parts of butadiene, to obtain, after 35 hours, a rubber latex F with a conversion of 95.5 percent.

The thus obtained rubber latex F had a weight average particle diameter of 0.28 μ, a degree of swelling of 16 and a gel content of 85 percent. The particle diameter distribution of the latex F was in the range of 0.1–1.5 μ.

manner as in Example 1, except that the rubber latex F was used and a monomer mixture comprising 20 percent of acrylonitrile, 70 percent of styrene and 10 percent of methyl methacrylate was graft-polymerized thereon.

Further, a terpolymer latex was obtained in the same manner as in Example 1, except that a monomer mixture comprising 80 parts of acrylonitrile, 280 parts of styrene and 40 parts of methyl methacrylate was used and the amount of t-dodecyl mercaptan was 1.0 part.

A resin composition was produced as in Example 1, except that the thus obtained graft-copolymer latex and terpolymer latex were used.

The resin compositions of Example 44 and comparative Example 30 were evaluated in plysical properties to obtain the results set forth in Table 11.

Table 11

|  | Melt Index | Izod Impact Strength | Total Luminous* Transmittance | Haze* |
|---|---|---|---|---|
| Example 44 | 35 | 8.3 | 86.5 | 10.3 |
| Comparative Example 30 | 42 | 7.5 | 58 | 35 |

* Sample was prepared at a metal mold temperature of 80°C, at a molding pressure of 75 kg/cm².

1. A thermoplastic resin composition having a high transparency substantially unaffected by molding conditions and a high impact strength which comprises (I) 97 to 99.99 percent by weight of a resin composed of (A) 10 parts by weight of a butadiene rubber selected from the group consisting of polybutadiene and styrenebutadiene rubbers containing at least 60 percent by weight of butadiene which butadiene rubber has a weight average particle diameter of 0.20 to 0.35 $\mu$, a particle diameter distribution in the range of 0.05 to 1.5 $\mu$ and a degree of swelling of at least 10, and (B) 15 to 190 parts by weight of a terpolymer of a monomer mixture comprising 30 to 65 percent by weight of styrene, 15 to 65 percent by weight of methyl methacrylate and 2 to 20 percent by weight of acrylonitrile, at least a portion of (I) being a graft-copolymer of (A) and (B) obtained by polymerizing at least 5 parts by weight of said monomer mixture in the presence of said (A) component over a period of 30 minutes to 10 hours in the presence of a radical polymerization initiator, said polymerization being effected while continuously or intermittently adding said monomer mixture to a latex of said (A) component; and (II) 0.01 to 3 percent by weight of an oily polyorganosiloxane.

2. A composition according to claim 1, wherein the resin (I) is obtained by continuously or intermittently adding and polymerizing the monomer mixture (B) in the presence of the butadiene rubber (A).

3. A composition according to claim 1, wherein the resin (I) is obtained by polymerizing, while adding continuously or intermittently, a part of the monomer mixture (B) in the presence of the butadiene rubber (A) to prepare a resin (I') and then polymerizing the remainder of the monomer mixture (B) in the presence of the resin (I').

4. A composition according to claim 1, wherein the resin (I) is obtained by polymerizing, while adding continuously or intermittently, at least 5 parts by weight of the monomer mixture (B) in the presence of the butadiene rubber (A) to prepare a resin (I') and then blending the resin (I') with a terpolymer (C) obtained by separately polymerizing the remainder of the monomer mixture (B).

5. A composition according to claim 4, wherein the terpolymer (C) is obtained by continuously adding the remainder of the monomer mixture (B) to water containing an emulsifier in an amount within the range from the critical micelle concentration thereof to 1.5 percent by weight based on the weight of the said remainder of the monomer mixture (B).

6. A composition according to claim 1, wherein the polyorganosiloxane is polydimethyl siloxane, polydiethyl siloxane or polyphenylmethyl siloxane.

7. A composition according to claim 1, wherein the polyorganosiloxane has a viscosity of 10 to 30 centistokes.

8. A composition according to claim 1, which is blended with a vinyl chloride polymer in an amount of 5 to 70 percent by weight based on the weight of said polymer.

* * * * *